March 25, 1952     E. H. LAND     2,590,185
PRESSURE ROLLER APPARATUS
Filed Dec. 1, 1945     4 Sheets-Sheet 1

INVENTOR
Edwin H. Land
BY Donald L. Brown
ATTORNEY

March 25, 1952     E. H. LAND     2,590,185
PRESSURE ROLLER APPARATUS
Filed Dec. 1, 1945     4 Sheets-Sheet 2

INVENTOR
Edwin H. Land
BY Donald L. Brown
ATTORNEY

March 25, 1952      E. H. LAND      2,590,185
PRESSURE ROLLER APPARATUS
Filed Dec. 1, 1945      4 Sheets-Sheet 3

INVENTOR
Edwin H. Land
BY
Donald L. Brown
ATTORNEY

March 25, 1952     E. H. LAND     2,590,185
PRESSURE ROLLER APPARATUS
Filed Dec. 1, 1945     4 Sheets-Sheet 4

INVENTOR
Edwin H. Land
BY Donald L. Brown
ATTORNEY

Patented Mar. 25, 1952

2,590,185

UNITED STATES PATENT OFFICE 2,590,185

PRESSURE ROLLER APPARATUS

Edwin H. Land, Cambridge, Mass., assignor to Polaroid Corporation, Cambridge, Mass., a corporation of Delaware Application December 1, 1945, Serial No. 632,193

14 Claims. (Cl. 74—392)

This invention relates generally to improvements in pressure roller appartus and more particularly to improved means for automatically varying compressive force exerted by the pressure rollers of said apparatus.

One object of the invention is to provide apparatus for automatically varying bodily movement of a pressure roller in accordance with variations in application of rotative power thereto.

Another object of the invention is to provide apparatus for automatically varying axial separation between a plurality of pressure rollers according to the rate of rotation of said pressure rollers.

A further object of the invention is to provide apparatus for automatically increasing axial separation between a plurality of pressure rollers upon removal of rotative power from said pressure rollers.

Still another object of the invention is to provide apparatus for automatically and predeterminedly varying compressive force exerted by a plurality of pressure rollers in accordance with variations in rotative speed of said pressure rollers.

A still further object of the invention is to provide apparatus for automatically relieving compressive force exerted between a plurality of rotating pressure rollers upon removal of rotative power therefrom.

Yet another object of the invention is to provide apparatus for automatically decreasing axial separation between a pair of pressure rollers upon application of rotative power thereto.

Still another object of the invention is to provide apparatus capable of predeterminedly selecting and maintaining any one of a plurality of compressive forces available between a pair of pressure rollers, the magnitude of said force being automatically determined by the rate of rotation of the pressure rollers.

Still further objects of the invention are to provide pressure roller apparatus for predeterminedly compressing, propelling, and spreading a viscous liquid over facing surfaces of a plurality of superposed sheet materials, said compression automatically varying according to variation in the rate of propulsion, and said liquid being spread over predetermined areas of said sheet materials in a constant thickness, at any selected rate of propulsion thereof.

Other objects of the invention will in part be obvious and will in part appear elsewhere.

The invention accordingly comprises the apparatus comprising the features, properties, and relation of components which are exemplified in the apparatus hereinafter described, and the scope of the application of which will be indicated in the claims.

In the drawings, wherein like reference characters refer to like parts throughout the several views, Figure 1 is a perspective view of pressure roller apparatus having one form of automatic means for varying the compression applied by the rollers;

Figure 5:
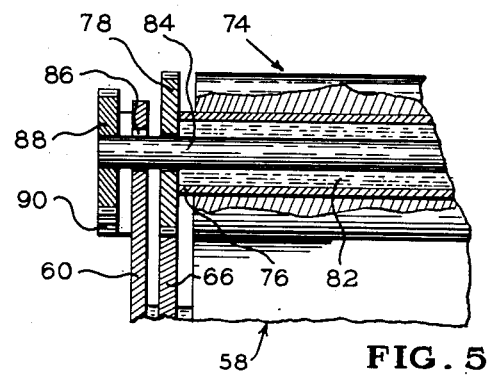
Fig. 5 is a plan view of the pressure roller apparatus of Fig. 4, partly in cross section and with parts broken away.
Figure 6:
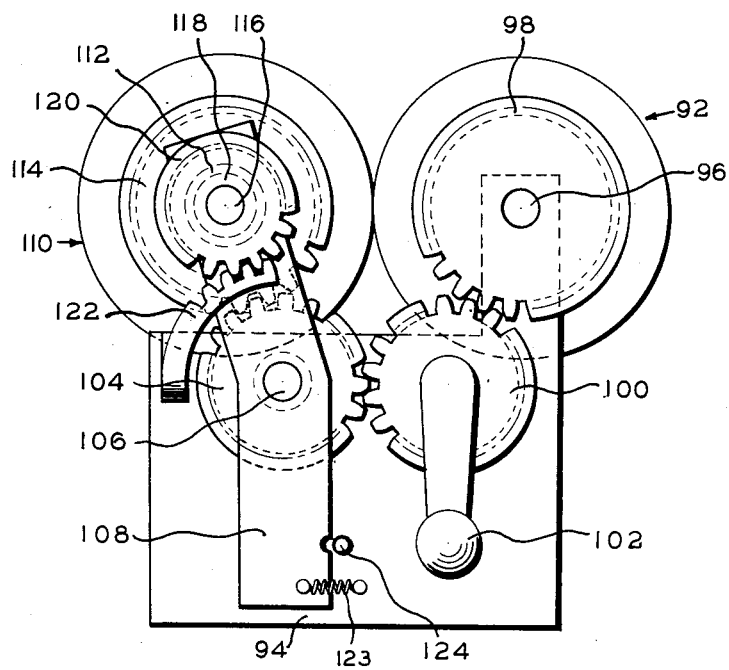
Fig. 6 is an elevational view of a further modification of pressure roller apparatus having automatic means for applying variations in pressure.
Figures 7, 8:
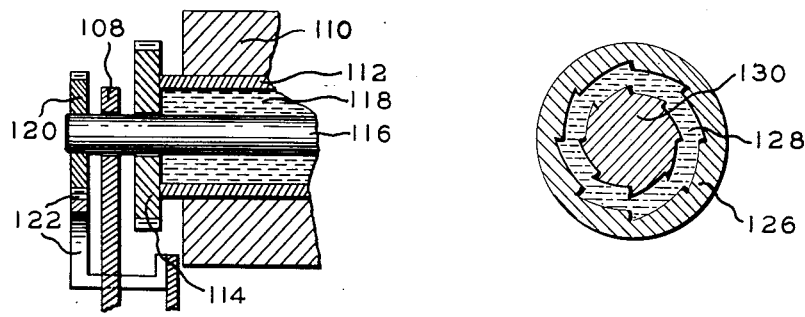
Fig. 7 is a sectional view of elements of Fig. 6, with portions thereof partly cut away.
Figure 9:
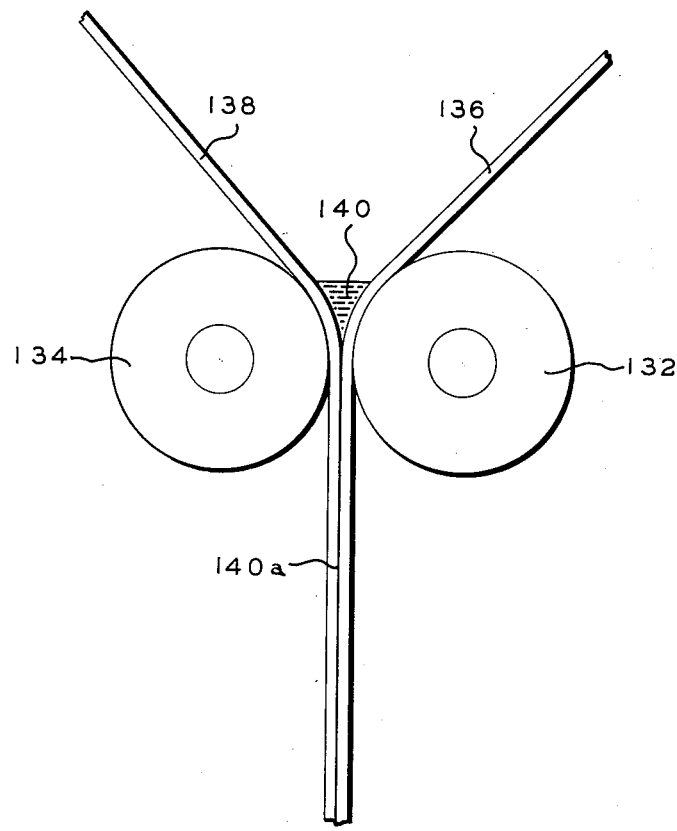

Fig. 8 is a transverse cross-sectional view of modified shafting suitable for use with the elements shown in Figs. 1, 2, 4, 5, 6 and 7; and Fig. 9 is a schematic view representing the application of compression by pressure rollers upon a composite sheet material, it being understood that any of the variable pressure means illustrated in previous figures are suitable for association with the pressure rollers shown.

Figure 1:
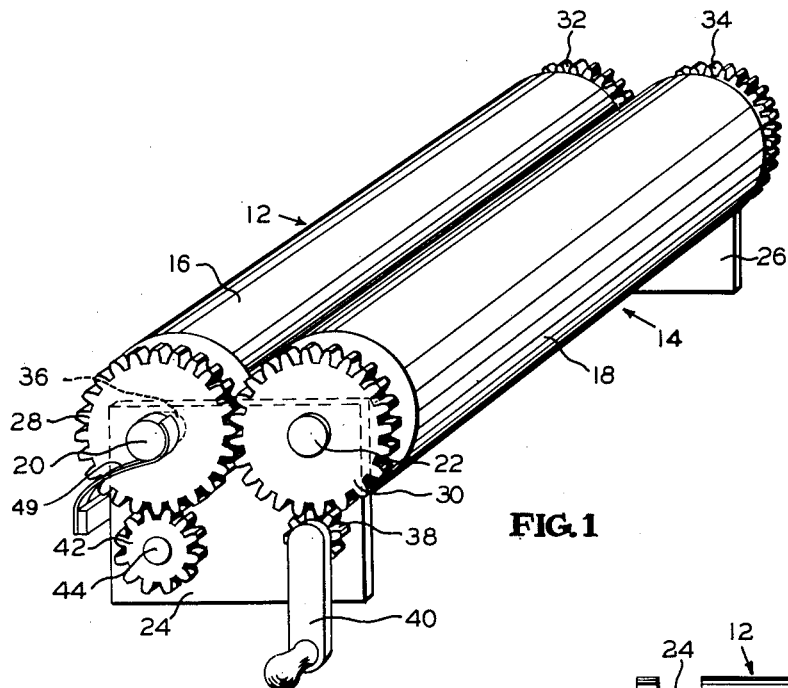
Figure 2:
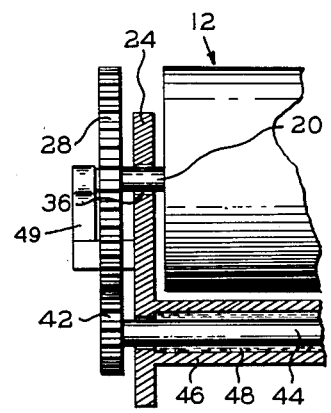
Fig. 2 is an elevational view of a portion of the apparatus of Fig. 1, partly in cross section and with parts broken away.

Referring to Fig. 1, pressure rollers 12 and 14 having means for automatically varying compressive force exerted thereby are illustrated, said pressure rollers comprising cores, not shown, surfaces 16 and 18 of either a suitable resilient material or a rigid material, said surfaces being dependent upon intended use, and shafts 20 and 22, rigidly fixed to the aforesaid cores, said shafts being rotatably mounted in end-plates 24 and 26. Simultaneous rotation of said pressure rollers is obtained by mutually engaged gears 28 and 30, said gears being rigidly attached to shafts 20 and 22, respectively, similarly engaged and attached gears 32 and 34 being optional and serving to produce a more positive transmission of rotative force from one roller to the other and a proper alignment of pressure roller axes. Shaft 20 is capable of movement along a plane cutting the axes of both pressure rollers, said movement being substantially perpendicular to the axis of shaft 22, the aforesaid movement being rendered possible by slot 36 in end-plate 24 and a similar slot, not shown, in end-plate 26, shaft 20 being mounted therein and pressure roller gears 28, 30, 32 and 34 being of similar pitch diameter and having teeth so constructed as to permit variations in their degree of mesh which may be required for permitting bodily movement of shaft 20. Rotative power is preferably initially supplied to that pressure roller which is incapable of bodily movement as, for example, by means of pinion gear 38 in engagement with pressure roller gear 30 and handcrank 40 rigidly fixed to the shaft of pinion gear 38, said shaft preferably having means, not shown, for permitting unidirectional rotation thereof. Gear 42 and shaft 44 rigidly fixed thereto, rotatably mounted in end-plates 24 and 26, a similar gear, not shown, preferably being mounted on shaft 44 at its extremity adjacent end-plate 26, constitute elements of a device for exerting a damping or braking influence upon pressure roller means 12 in such fashion that said roller means is urged toward pressure roller means 14 upon rotation of gear 28, said influence being applied to said roller means 12 by engagement of gear 42 with gear 28. Elements for producing the aforesaid damping or braking influence are shown in Fig. 2 wherein rotatable shaft 44 extends coaxially within a fixed hollow tube or cylinder 46, said tube having an appreciably larger internal diameter than the diameter of shaft 44 and said hollow tube being rigidly attached to end-plates 24 and 26 and containing a viscous liquid 48 as, for example, silica aerogel, and said viscous liquid providing frictional opposition to rotation of shaft 44. The construction and characteristics of elements comprising the aforesaid damping or braking device are such that rotation of shaft 44 and frictional influence applied thereto by viscous liquid 48 vary directly and it is to be understood that said construction and elements are adapted to insure a predetermined drag upon shaft 44 in accordance with any given rate of rotation thereof. Spring 49, of Fig. 1, rigidly fixed to end-plate 24 and bearing against shaft 20, and a similar spring, not shown, bearing against shaft 20 adjacent its opposite extremity, serve to move pressure roller 12 axially away from pressure roller 14 when rotative power is removed.

In operation of the apparatus in Figs. 1 and 2 it will be apparent that rotation of handcrank 40 and associated pinion gear 38 in a clockwise direction will produce counterclockwise and clockwise directions of rotation, respectively, of gears 30 and 28 and associated pressure rollers 12 and 14 and that gear 28, being engaged with gear 42 and said last-named gear having a braking influence applied thereto, will thus meet rotative opposition from said gear 42 and be provided thereby with a tendency to carry shaft 20 along slot 36 in a direction toward shaft 22, the aforesaid operations producing a bodily movement of pressure roller surface 16 toward pressure roller surface 18. In accordance with the above described variable braking effect imparted from gear 42, increases in rotative speed applied to the rotatable elements of the apparatus produce an increasing tendency on the part of pressure roller 12 to move toward pressure roller 14 and, conversely, diminishing speeds of rotation applied thereto provide pressure roller 12 with a lessening tendency to move toward pressure roller 14. When rotative power is no longer applied to said elements, pressure roller 12 is relieved of the braking force causing its bodily movement toward pressure roller 14 and is actuated to move in a direction away from pressure roller 14 by spring 49 as well as by forces originating in the tendency of compressed resilient pressure roller surfacing materials to resume their original form or in a similar tendency on the part of a material as, for example, a resilient sheet material undergoing compression between said pressure rollers, or in a combination of said tendencies. It will thus be understood that said spring means may not be essential to the aforesaid movement of pressure roller 12 away from pressure roller 14. In the light of the constructions set forth, said separative movement of pressure roller 12 away from pressure roller 14 is accompanied by a lesser engagement of gear 28 with gear 30, movement of shaft 20 along slot 36 in a direction away from shaft 22, and rotation of gear 42 in a counterclockwise direction and to an extent determined by the aforesaid separative forces affecting said pressure rollers, it being understood that restriction imparted by said viscous liquid means to torque applied to gear 42 is less than said torque and that maximum separation of the aforesaid pressure rollers is predetermined by the length of slot 36. It will be understood that minimum separation between the axes of pressure rollers may also be established by the length of slot 36 and that either contact of a pair of pressure roller surfaces or a slight separation thereof at said position of minimum separation between the axes may be desirable depending upon factors comprising the surfacing material of said pressure rollers and the composition of material undergoing compression therebetween.

Figure 3:
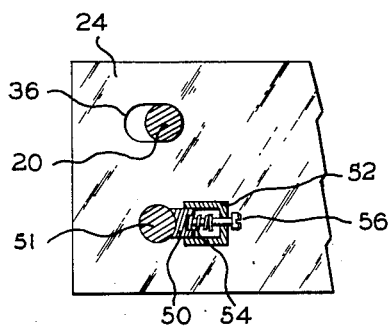
Fig. 3 is a fragmentary elevational view comprising a modification of elements in Fig. 1 for providing automatic variation of compression applied by pressure rollers.

In Fig. 3 a modification of shaft 44 and bearing means therefor of Fig. 1 is shown, it being understood that said modification is adapted to use with the gearing and pressure rollers of Fig. 1 to bodily move pressure roller 12 with respect to pressure roller 14. Said modification consists of a device for applying a braking force to gear 42 of Fig. 1 and comprises shoe 50 in frictional contact with the aforesaid modified shaft 51, said shoe being movable in a direction perpendicular to the axis of shaft 51 along track 52 and said frictional force being determined by spring 54 as compressed by screw 56. Applying the modified device of Fig. 3 to pressure rollers and gearing of Fig. 1, rotation of handcrank 40 will cause gear 28 to rotate against said braking action applied to gear 42 and cause pressure roller 12 to move along slot 36 toward pressure roller 14. It will be evident that the resultant compressive force exerted by the pressure rollers will be substantially constant and of a magnitude dependent upon the degree of braking force applied to gear 42 by the means shown in Fig. 3 in combination with the resiliency of pressure roller surfaces and/or that of the material compressed relative to said braking force in contrast to the variable compression possible by means of the braking elements of Fig. 1. Upon removal of rotative power from handcrank 40, movement of pressure roller 12 in a direction away from pressure roller 14, thereby relieving compressive force of said pressure rollers, may be obtained by spring means, not shown but similar to that already described in conjunction with the apparatus of Fig. 1, or by the resilient characteristics of pressure roller surfacing materials, said pressure roller separative means being sufficient to overcome the braking restriction on torque applied to gear 42.

Figure 4:
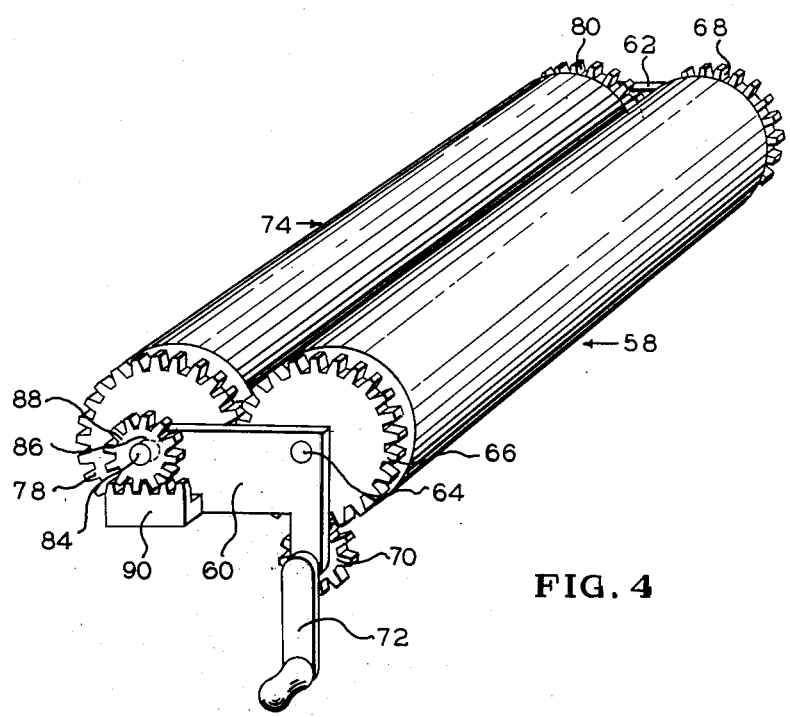
Fig. 4 is a perspective view of a further modification of the pressure roller apparatus of Fig. 1.

In Figs. 4 and 5 a modification of the apparatus of Figs. 1 and 2 for automatically varying and eliminating compression between pressure rollers is shown. Pressure roller 58 is rotatably mounted in end-plates 60 and 62 by means of shaft 64 rigidly attached to said pressure roller. Gears 66 and 68, similar in design to gears 28 and 30 of Fig. 1, are rigidly fixed to shaft 64, gear 66 being driven by pinion gear 70 and attached handcrank 72, the latter elements preferably having unidirectional means, not shown, associated therewith. Pressure roller 74 embodies a hollow tube or cylinder 76 (Fig. 5) rigidly fixed to the core thereof and being coaxial therewith, a portion of said tube extending from the pressure roller being rigidly attached to gears 78 and 80, said gears being of similar design to gears 66 and 68, and said hollow tube containing a viscous liquid 82 such as silica aerogel. Gears 78 and 80 are rotatably mounted on shaft 84, a fluid seal, not shown, being understood to exist between gear 78 and shaft 84, and said shaft, in turn, being rotatably mounted and capable of bodily movement in slots of end-plates 60 and 62, only one of said slots 86, being shown. It will be noted that shaft 84 extends coaxially through hollow tube 76, out of contact with said tube but in frictional contact with viscous liquid 82 contained therein and substantially filling the space between said shaft and tube, the aforesaid shaft being provided, preferably at both extremities, with gears rigidly attached thereto, only one of said gears 88 being shown, and said gears being engaged with racks attached to end-plates 60 and 62, only one of said racks 90, only, being illustrated.

In operation, the apparatus of Figs. 4 and 5 is adapted to function as follows: rotation of handcrank 72 and attached pinion gear 70 in a clockwise direction produces counterclockwise rotation of engaged gear 66, gear 68, and associated pressure roller 58, said gears 66 and 68 being engaged with and driving gears 78 and 80 and pressure roller 74, associated therewith, in a clockwise direction. Rotation of said last-named gears and pressure roller produces a similar rotation of hollow tube 76, said rotation being frictionally transmitted by viscous liquid 82 to rotatable shaft 84 and attached gear 88 and said friction varying with the speed of rotation of hollow tube 76 by nature of the composition of said viscous liquid. Gear 88 engaged with and rotatable with respect to fixed rack 90 provides the aforementioned elements associated with pressure roller 74 with means for obtaining their bodily movement toward pressure roller 58, said movement being limited by the length of travel permitted shaft 84 along slot 86 and said forces of bodily movement producing an increase in compression between surfaces of pressure rollers 74 and 58. When rotative power is removed, separative bodily movement of pressure roller 74 with respect to pressure roller 58 may be produced by means similar to that previously described relative to the apparatus of Figs. 1 and 2, said separative bodily movement being accompanied by movement of shaft 84 along slot 86 in a direction away from shaft 64, and rotation of both gear 68, engaged with rack 90, and shaft 84 in a counterclockwise direction due to said direction of their bodily movement. It will be understood that the above-described operations for relief of compression are rendered possible by reason of separative forces sufficient to overcome the braking influence of viscous liquid 82 upon shaft 84. It will further be understood that unidirectional driving means associated with gear 70 may be employed to prevent rotation of the pressure rollers during the above-described separative operations but said means are not essential thereto provided viscous liquid 82 is of a composition possessing transmissional properties insufficient to transmit an operational rotative force from shaft 84 to hollow tube 76 at that speed of rotation imparted to shaft 84 by the aforesaid forces causing separation of the pressure rollers.

Figs. 6 and 7 show a further modification of pressure roller apparatus useful for operations similar to those of the apparatus of Figs. 4 and 5, said modification, however, obviating the previously described requirement of varying engagement of gear teeth during the bodily movement of pressure roller gears. The apparatus of Figs. 6 and 7 comprises driving gears, a modified planetary gear system, and a gear sector for obtaining bodily movement of one pressure roller with respect to another. Pressure roller 92 is rotatably mounted in end-plates, one of said end-plates 94, only, being shown, said mounting being achieved by means of shaft 96 rigidly fixed to the pressure roller and said shaft having gear 98 rigidly attached thereto for receiving rotative power. Gear 100 having handcrank 102 attached thereto and preferably possessing means for unidirectional rotation, not shown, is rotatably mounted in end-plate 94 and provides rotative power to gear 98 and to gear 104, said last-named gear being rotatably mounted on pivot 106 and said pivot being rigidly fixed to end-plate 94. Arm 108 is likewise rotatably mounted on pivot 106, out of contact with gear 104, and bears an assembly consisting of pressure roller 110 and associated elements comprising a hollow tube or cylinder 112 rigidly fixed to said pressure roller and coaxial therewith, a portion of said tube extending from the pressure roller and having gear 114 rigidly fixed thereto. Gear 114 is in engagement with the aforesaid gear 104, and receives rotative force therefrom which is applied to rigidly attached pressure roller 110. Gear 114 is rotatably mounted on shaft 116, said shaft, in turn, being rotatably mounted in a bearing of arm 108. It will be noted that shaft 116 extends coaxially through hollow tube 112, out of contact with said tube but in frictional contact with a viscous liquid 118, such as silica aerogel, contained in said tube, and substantially filling the space between said tube and shaft, said liquid being adapted to transmit rotative force from hollow tube 112 to shaft 116. Gear 120 is rigidly attached to an extremity of shaft 116 and is engaged with gear sector 122, said sector being integral with or otherwise rigidly secured to end-plate 94.

In the operation of apparatus of Figs. 6 and 7, rotation of handcrank 102 and attached gear 100 in a clockwise direction produces counterclockwise rotation of engaged gear 98, associated pressure roller 92, and engaged gear 104 and said last-named gear, in engagement with gear 114, causes clockwise rotation of said gear 114 and similar rotation of pressure roller 110 rigidly attached thereto by means of hollow tube 112. Rotation of hollow tube 112, in frictional contact with viscous liquid 118, produces rotation thereof and said rotating liquid, likewise in frictional contact with rotatable shaft 116, causes said shaft to rotate, transmission of rotative force by the aforesaid viscous liquid varying according to the rotative speed applied thereto by nature of the composition of said liquid. Rotation of shaft 116 is accompanied by similar rotation of rigidly attached gear 120 and said gear, in engagement with fixed gear sector 122, is caused to move bodily in the arc of said gear sector toward pressure roller 92, causing similar bodily movement of pressure roller 110 and associated elements, said movement being permitted by the ability of arm 108 to rotate about pivot 106. It will accordingly be apparent that the above-described operations cause the surface of pressure roller 110 to approach the surface of pressure roller 92 and to apply compressive forces between said surfaces which vary in intensity with rotative speeds applied thereto. When rotative power is removed from the aforementioned elements, separative bodily movement of pressure roller 110 with respect to pressure roller 92 may be produced by spring means 123 or by pressure roller surfacing characteristics, similar to those previously described relative to the apparatus of Figs. 1 to 5, inclusive, said movement being rendered possible by the ability of arm 108 to rotate about pivot 106 and by the ability of gear 120 and shaft 116 to rotate in a counterclockwise direction although opposed by braking force applied to said shaft through frictional contact with static viscous liquid 118. Stop 124 fixed to end-plate 94 provides a limit to counterclockwise rotation of arm 108 and thus a limit to separation of pressure roller surfaces, it being apparent that a similar stop may also be positioned to contact a transversely opposite edge of arm 108 and thereby limit the bodily movement of pressure roller 110 toward pressure roller 92. It will further be understood that the aforesaid unidirectional driving means associated with gear 100 will prevent reverse rotation of pressure rollers during the above-described separative operations although said means are not essential thereto provided the transmissional properties of viscous liquid 118 are rendered inoperative during the aforesaid operations of separative bodily movement.

Fig. 8 illustrates a modification of the component for providing braking force in Figs. 1 and 2 and for transmitting rotative force in Figs. 4, 5, 6 and 7 and comprises hollow tube 126 containing a viscous liquid 128 and a rotatable shaft 130 extending coaxially therein. In said modification, facing surfaces of hollow tube 126 and shaft 130, respectively, are provided with vanes whereby a greater frictional contact may be obtained between said viscous liquid and said surfaces, and thus, a more positive transmission of rotative forces or an increased braking action is possible by said means than by the smooth-surfaced hollow tube and shaft heretofore shown.

In the schematic drawing of Fig. 9, the compressive and propulsive action of a pair of pressure rollers upon two strips of sheet material having a limited quantity of a viscous liquid introduced therebetween is shown. In said drawing, it is to be assumed that pressure roller 132 is rotatably mounted in a fixed member and that pressure roller 134 is both rotatably mounted and capable of bodily movement toward or away from pressure roller 132, said movements being actuated by any of the means previously described with respect to Figs. 1 to 8, inclusive. Assuming said pressure rollers, strip materials, and liquid to be adapted for photographic use, as, for example, in a camera, strip 136 may comprise a film having at least a photographically exposed frame, strip 138 may be a paper material, suitable for carrying a positive print and liquid 140 may constitute a viscous liquid adapted to permeate and react upon said photographically exposed frame of film 136 to develop a latent negative image and to provide a positive image-forming component therein, and adapted to transport said component to paper material 138 or to a coating formed thereon by said liquid, the aforesaid processes being initiated by the compression and propulsion of said strip materials and by the attendant spreading of liquid 140a over facing surfaces of said strip materials.

It is well known that pressure rollers may be employed in various mechanisms to provide suitable means for laminating or otherwise processing a plurality of sheet materials. More specifically, in a camera mechanism of a type for providing positive prints in conjunction with the photographic exposure of a photosensitive film, as described in my copending application Serial No. 620,744, filed October 6, 1945, for Camera Structure, (now Patent No. 2,435,717) pressure rollers may comprise means both for compressing and propelling a plurality of sheet materials in superposed relationship and for releasing a liquid to, and spreading said liquid over facing surfaces of said sheet material. Pressure rollers, thus employed, may be surfaced with rubber or some other suitable resilient material or with a substantially rigid material such as a metal, wood, or a plastic, the choice of surfacing being generally dependent upon the type of sheet material employed and the quality of compressive and propulsive forces required. Where pressure roller surfacing is of a resilient material and remains static and under compression for a relatively long period due, for example, to non-use, it may become permanently deformed and the operational efficiency thereof may be impaired. Mechanisms described herein for automatically relieving compression of pressure rollers upon termination of applied rotative power thereto provide means for preventing undesirable permanent deformations of their surfacing material.

Where a liquid, and more particularly a viscous liquid, is employed in conjunction with pressure roller means for laminating or otherwise treating sheet materials, the process of spreading said liquid over facing areas of said sheet materials is affected by factors comprising: the surface composition of the sheet materials, the supply of liquid available for coverage of predetermined areas of the sheet surfaces, the viscosity of said liquid, and the relationship between the compressive force applied to said sheet materials and the speed of rotation of the pressure rollers. As an example, in a photographic process two superposed sheet materials such as a strip of film and a strip of paper may be introduced between pressure rollers and a predetermined quantity of a liquid of a given viscosity, carried within a container attached to the aforementioned strip of paper, may be released between said superposed materials by means of the compression applied to the aforesaid container by said pressure rollers. Upon further rotation of the pressure rollers said liquid may be spread in the form of a coating over predetermined facing areas of said paper and strip of film. Taking cognizance of the inherent reluctance of a viscous liquid to spread under compressive force, and of the frictional opposition offered to said spreading process by the surfaces of the sheet materials it will be apparent that at a given speed of rotation of the pressure rollers, i. e., for a given period of application of compression to each successive area of said materials passing between the pressure rollers, a predetermined compressive force will be required to provide both adequate spreading of the aforesaid liquid and a specified thickness thereof.

Where propulsion of superposed sheet materials by pressure roller means is subject to variation or fluctuation, as, for example, where rotative power is supplied by a handcrank, the aforementioned period of application of compressive force thereto may, accordingly, also be caused to vary or fluctuate. Assuming a fixed compression between pressure rollers and a limited quantity of a liquid of an appreciable viscosity, said quantity being designated for spreading over predetermined facing areas of said superposed sheet materials, it will be apparent that a decrease in period of compressive application by said rollers, due to more rapid rotation thereof, may provide a lesser ability of said pressure rollers to overcome the inherent reluctance of the viscous liquid to undergo spreading and to offset the frictional opposition of the sheet surfaces to said process resulting in inadequate coverage, in too thick a coating of said liquid, or in both conditions. Conversely, an increase in period of compressive application by said pressure rollers, due to slower rotation thereof, will provide a greater ability of said pressure rollers to overcome said characteristics of the viscous liquid and sheet surfaces and may result in either too thin a coating of said liquid, or an undesirable excess thereof flowing beyond the areas designed for coverage, or in both conditions.

In accordance with the above-described operations, the pressure roller apparatus of this invention comprises novel means for predeterminedly and automatically varying the compressive properties of pressure roller components thereof according to variations in rotative power applied to said apparatus, said means comprising elements for differentially transmitting or damping rotative force. It will be understood that said predetermination of compression at any given rate of rotation contemplates the employment of predefined constructions and materials comprising gear ratios, positioning of elements, pressure roller surfaces, dimensions of cylinder and coaxial shaft, and viscosity of liquid contained in said cylinder.

Where, for example, a viscous liquid is to be spread over facing surfaces of a plurality of sheet materials undergoing compression by said pressure roller means, no variation in the supply of said liquid or other means extraneous to said apparatus is required to substantially insure formation of a coating of said liquid of a predetermined constant thickness at varying speeds of applied rotative power. In the above-described embodiments, one pressure roller only of a given pair has been represented as capable of bodily movement. It will be understood, however, that further modifications of the apparatus are possible, comprising means for obtaining said bodily movement of a plurality of pressure rollers, said means being substantially similar to those described herein, whereby a pair of pressure rollers may be caused to converge or diverge in said operations of automatic variation of compression. With respect to the above-described means for automatically altering compression exerted by pressure rollers according to relative rate of rotation of said rollers, it is to be understood that maintenance of any fixed rate of rotation of the pressure rollers at some point within a variable range is accompanied by a substantially constant compression at said fixed rate. Although the apparatus described herein is shown as manually powered, and the aforesaid means for automatically varying compressive force are particularly adapted to manually operated pressure roller apparatus, it is to be understood that said means are also adapted to serve generally similar functions in conjunction with motor-powered pressure roller apparatus of the general type referred to.

Since certain changes may be made in the above-described apparatus and different embodiments of the invention could be made without departing from the scope thereof, it is intended that all matter contained in the above description or shown in the accompanying drawings shall be interpreted as illustrative and not in a limiting sense.

What is claimed is:

1. A pressure roller apparatus for automatically and predeterminedly varying compression between pressure rollers according to the rate of rotation thereof and for substantially eliminating said compression when torque is removed therefrom, said apparatus comprising, in combination, a pair of pressure rollers suitably surfaced for compressing and advancing sheet materials disposed therebetween, means for simultaneously rotating said pressure rollers, means for mounting one of said pressure rollers so that it may be moved bodily toward and away from the other of said rollers, and means responsive to the rotation of said bodily movable pressure roller in a direction for advancing said sheet materials for urging said roller toward the other of said rollers, said last-named means comprising a cylinder, a rotatable shaft coaxial with said cylinder and a viscous liquid contained between said shaft and cylinder and in frictional contact therewith, said fluid acting to transmit a torque between said shaft and cylinder.

2. In apparatus of the character described, in combination, at least a pair of cooperating pressure rollers, means for mounting at least one of said rollers so that it may be moved bodily with respect to the other of said rollers whereby the separation of said rollers and the compression applied by said rollers to material therebetween may be varied, and means responsive to the rotation of said bodily movable roller for urging said roller toward the other of said rollers, said last-named means comprising a rotatable member, means rotationally connecting said rotatable member and said bodily movable pressure roller, a tubular housing for at least a portion of said rotatable member and a viscous liquid disposed within said housing and adapted to exert a braking force opposing the rotary motion of said rotatable member, said rotatable member being axially spaced from said bodily movable pressure roller.

3. In apparatus of the character described, in combination, at least a pair of cooperating pressure rollers, means for mounting at least one of said rollers so that it may be moved bodily toward and away from the other of said rollers whereby the separation of said rollers and the compression applied by said rollers to material therebetween may be varied, and means responsive to the rotation of said bodily movable roller for urging said roller toward the other of said rollers, said last-named means comprising a turnable member, rotative means of said bodily movable pressure roller connecting with rotatable means of said turnable member and braking means for opposing the rotation of said turnable member, said braking means including a friction shoe adapted to frictionally engage a surface of said turnable member.

4. In apparatus of the character described, in combination, at least a pair of pressure rollers, means for mounting at least one of said roller so that it may be moved bodily toward and away from the other of said rollers while maintaining the axes of said rollers in parallel relation whereby the compression applied by said rollers to material therebetween may be varied, and means responsive to the rotation of said bodily movable roller for urging said roller toward the other of said rollers, said last-named means comprising a rotatable member, means rotationally connecting said rotatable member and said bodily movable pressure roller and braking means for opposing the rotation of said rotatable member, said braking means including an adjustable friction shoe adapted to frictionally engage a surface of said rotatable member, said bodily movable roller being urged to move toward the other roller in accordance with the resistance to rotary movement applied by said braking means to said rotatable member.

5. In apparatus of the character described, in combination, at least a pair of pressure rollers, means for mounting at least one of said rollers for bodily movement with respect to the other of said rollers whereby the compression applied by said rollers may be varied, and means responsive to the rotation of said bodily movable roller for urging said roller toward the other of said rollers, said last-named means comprising a rotatable member having portions concentrically mounted with respect to said bodily movable pressure roller, torque transmitting means connecting said rotatable member to said bodily movable pressure roller and a mechanism engaging said rotatable member for converting torque thereof into an urge for bodily movement thereof.

6. Apparatus for progressively subjecting sheet materials to compression to provide hydraulic flow of a fluid between a plurality of layers of said materials, said apparatus comprising, in combination, at least a pair of pressure rollers, means for mounting at least one of said rollers for bodily movement toward and away from the other of said rollers whereby the compression applied by said rollers may be varied, and means responsive to the rotation of said bodily movable roller for biasing said roller toward the other of said rollers, said last-named means comprising a rotatable member mounted for individual rotation concentric with said bodily movable pressure roller, means frictionally coupling said bodily movable roller and said rotatable member for transmitting a torque from said roller to said member, the frictional connection between said bodily movable roller and said rotatable member being adapted to permit rotation of one of said bodily movable roller and said rotatable member when the other is held stationary and mechanism engaging said rotatable member for converting torque thereof to bodily movement in a direction for providing the aforesaid bodily movement of said movable pressure roller.

7. Apparatus for progressively subjecting sheet materials to compression to provide hydraulic flow of a fluid between a plurality of layers of said materials, said apparatus comprising, in combination, at least a pair of pressure rollers, means for mounting at least one of said rollers for bodily movement toward and away from the other of said rollers whereby the compression applied by said rollers may be varied, and means responsive to the rotation of said bodily movable roller for biasing said movable roller toward the other of said rollers, said last-named means comprising a tubular fluid-tight chamber formed within said bodily movable roller, a rotatable member extending through said chamber and mounted for individual rotation concentric with said bodily movable roller, a viscous fluid frictionally coupling said tubular portions of said movable pressure roller and said rotatable member for transmitting a torque from said movable roller to said member and mechanism engaging said rotatable member for converting torque thereof to bodily movement in a direction for urging said movable pressure roller toward the other pressure roller.

8. Apparatus for progressively subjecting sheet materials to compression to provide hydraulic flow of a fluid between a plurality of layers of said materials, said apparatus comprising, in combination, at least a pair of pressure rollers, means for mounting at least one of said rollers for bodily movement toward and away from the other of said rollers whereby the compression applied by said rollers may be varied, and means responsive to the rotation of said bodily movable roller for biasing said movable roller toward the other of said rollers, said last-named means comprising a rotatable member mounted for individual rotation concentric with said bodily movable pressure roller, means frictionally coupling said bodily movable roller and said rotatable member for transmitting a torque from said movable roller to said member, the frictional connection between said bodily movable roller and said rotatable member being adapted to permit rotation of one of said bodily movable roller and said rotatable member when the other is held stationary and mechanism engaging said rotatable member for converting torque thereof to bodily movement in a direction for urging said bodily movable roller toward the other pressure roller, said mechanism comprising a gear rigidly secured to said rotatable member and a stationary rack.

9. Photographic apparatus for progressively subjecting sheet materials comprising an exposed photographic film to compression to provide hydraulic flow of a film processing fluid between a plurality of layers of said materials, said apparatus comprising, in combination, at least a pair of pressure rollers, means for mounting at least one of said rollers for bodily movement toward and away from the other of said rollers whereby the compression applied by said rollers may be varied, and means responsive to the rotation of said bodily movable roller for biasing said movable roller toward the other of said rollers, said last-named means comprising a rotatable member mounted for individual rotation concentric with said bodily movable pressure roller, means frictionally coupling said bodily movable roller and said rotatable member for transmitting a torque from said movable roller to said member, the frictional connection between said bodily movable roller and said rotatable member being adapted to permit rotation of one of said bodily movable roller and said rotatable member when the other is held stationary and mechanism engaging said rotatable member for converting torque thereof to bodily movement in a direction for urging said bodily movable roller toward the other pressure roller, said mechanism comprising a gear rigidly secured to said rotatable member and a stationary gear sector.

10. Photographic apparatus for progressively subjecting sheet materials comprising an exposed photographic film to compression to provide hydraulic flow of a film processing fluid between a plurality of layers of said materials, said apparatus comprising, in combination, at least a pair of pressure rollers, means for pivotally mounting at least one of said rollers to permit bodily movement thereof toward and away from the other of said rollers whereby the compression exerted by said rollers may be varied, and means responsive to the rotation of said bodily movable roller for biasing said movable roller toward the other of said rollers, said last-named means comprising a rotatable member mounted for individual rotation concentric with said bodily movable pressure roller, means frictionally coupling said bodily movable roller and said rotatable member for transmitting a torque from said movable roller to said member, the frictional connection between said bodily movable roller and said rotatable member being adapted to permit rotation of one of said bodily movable roller and said rotatable member when the other is held stationary and mechanism engaging said rotatable member for converting torque thereof to bodily movement in a direction for providing the aforesaid bodily movement of said movable pressure roller.

11. In apparatus of the character described, a pair of pressure rollers, means for mounting at least one of said rollers so that it may be moved bodily toward and away from the other of said rollers, and means responsive to rotation of said bodily movable roller for urging said movable roller toward the other roller, said last-named means comprising a shaft having a portion concentric with said bodily movable pressure roller and a portion extending from said movable roller, means connecting said bodily movable roller and said shaft so that rotation of said bodily movable roller tends to impart rotation to said shaft, a circular member mounted upon said extending portion of said shaft and adapted to be rotated by said shaft and an element mounted adjacent and engaging said circular member for converting rotation of said circular member to bodily movement thereof.

12. In an apparatus for progressively subjecting sheet materials to compression wherein the compression is automatically varied in accordance with the speed of operation of said apparatus, in combination, at least a pair of pressure rollers adapted to have said sheet materials advanced therebetween, means for mounting at least one of said rollers so that it may be moved bodily toward and away from the other of said rollers and mechanism connected to and being rendered operative by the rotation of said bodily movable roller for urging the latter roller towards the other of said rollers in response to the rotation of said bodily movable roller about its axis, said mechanism comprising a rotary element so connected to the bodily movable roller that the rotation of said bodily movable roller imparts a torque to said rotary element tending to rotate the latter about its axis, frictional means, and means for holding said frictional means so that the latter is in operative frictional engagement with said rotary element, relative rotation between said last-named holding means and said rotary element being resisted by said frictional means, said resistance being converted by said mechanism to a force bodily urging said bodily movable roller in the direction of said other roller.

13. In the apparatus of claim 12, means for urging the bodily movable roller in a direction away from the other roller, said last-named means exerting a lesser force than the force which urges said bodily movable roller in the direction of said other roller upon the rotation of said bodily movable roller, whereby said last-named means is adapted to move said bodily movable roller away from said other roller only upon termination of rotation of said bodily movable roller.

14. In the apparatus of claim 12, a limit stop for limiting bodily movement of said bodily movable roller in the direction of said other roller.

EDWIN H. LAND.

REFERENCES CITED

The following references are of record in the file of this patent:

UNITED STATES PATENTS

| Number | Name | Date |
| --- | --- | --- |
| 1,110,616 | Fargeson | Sept. 15, 1914 |
| 1,150,092 | Anger | Aug. 17, 1915 |
| 2,268,829 | Kauffman | Jan. 6, 1942 |
| 2,333,902 | Thiele et al. | Nov. 9, 1943 |
| 2,395,903 | Nordquist | Mar. 5, 1946 |